US012637088B1

(12) United States Patent
Escatel et al.

(10) Patent No.: US 12,637,088 B1
(45) Date of Patent: May 26, 2026

(54) DRIVER AWARENESS COVERAGE USING OCULAR DATA

(71) Applicant: GM Global Technology Operations LLC, Detroit, MI (US)

(72) Inventors: Alexander Escatel, Clinton Township, MI (US); James Scott MacGuidwin, Northville, MI (US); Patrick Cooke, Bloomfield Hills, MI (US); Gyan Vardhan Singh, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/960,301

(22) Filed: Nov. 26, 2024

(51) Int. Cl.
| | |
|---|---|
| *G08B 23/00* | (2006.01) |
| *B60W 40/08* | (2012.01) |
| *B60W 50/14* | (2020.01) |
| *G06V 20/59* | (2022.01) |
| *G06V 40/16* | (2022.01) |

(52) U.S. Cl.
CPC ............ *B60W 40/08* (2013.01); *B60W 50/14* (2013.01); *G06V 20/597* (2022.01); *G06V 40/171* (2022.01); *B60W 2040/0818* (2013.01); *B60W 2050/143* (2013.01); *B60W 2050/146* (2013.01); *B60W 2420/403* (2013.01); *B60W 2540/225* (2020.02); *B60W 2540/229* (2020.02)

(58) Field of Classification Search
CPC ................ B60W 40/08; B60W 50/14; B60W 2040/0818; B60W 2050/143; B60W 2050/146; B60W 2420/403; B60W 2540/225; B60W 2540/229; G06V 20/597; G06V 40/171

USPC ...................... 340/576, 575, 573.1, 435, 436
See application file for complete search history.

(56) References Cited

U.S. PATENT DOCUMENTS

| | | | | |
|---|---|---|---|---|
| 2019/0144003 A1* | 5/2019 | Hyuga | ................. | G06V 20/597 |
| | | | | 340/425.5 |
| 2021/0357670 A1* | 11/2021 | Wu | ......................... | G06V 20/56 |
| 2023/0131471 A1* | 4/2023 | Sobecki | ................... | B60R 11/04 |
| | | | | 348/148 |
| 2023/0230396 A1* | 7/2023 | Herbert | .................. | G06V 40/18 |
| | | | | 348/78 |
| 2024/0067182 A1* | 2/2024 | Persson | ................. | B60W 50/14 |
| 2024/0199082 A1* | 6/2024 | Balch | ................ | B60W 60/0055 |

* cited by examiner

*Primary Examiner* — Anh V La
(74) *Attorney, Agent, or Firm* — Vivacqua Crane, PLLC

(57) ABSTRACT

A driver awareness coverage (DAC) system includes a vehicle having notification devices and sensors capturing optical information about a vehicle driver. A DAC application defines areas of interest (AoIs) surrounding the vehicle; processes the optical information; estimates a driver gaze direction, field-of-view, and focal point, and maps the gaze direction to the AoIs. The DAC application determines the gaze direction is in a range of known passenger compartment locations; defines a lifespan for each AoI, and selectively updates each AoI lifespan depending on gaze direction. A stimulus subroutine is executed when a lifespan of an AoI has been exceeded. The lifespan is exceeded when the gaze direction has not passed through the AoIs for an extended period of time. Then, the DAC application generates a notification to the driver that prompts the driver to break a distracted, hypnotic or altered mental state and increase a driver attention level.

18 Claims, 4 Drawing Sheets

DRIVER AWARENESS COVERAGE USING OCULAR DATA

INTRODUCTION

The present disclosure relates to driver assistance systems, and more particularly to systems for driver attentiveness monitoring.

During vehicle operation, vehicle operators or drivers may enter an altered mental state colloquially known as highway hypnosis or "white line fever" in which state, a vehicle operator can drive lengthy distances and adequately respond to external events without recollection of consciously having done so. Highway hypnosis has been theorized to arise due to monotonous scenery, even including the "flicker" of light glare and white road surface or lane markings. Accordingly, vehicle operators are advised and trained to periodically change their gaze. In fact, many drivers education courses include instructions to: check your mirrors every 5 to 8 seconds; and check your mirrors in a particular order, namely: rear view mirror, side view mirror, road ahead. In addition, mirrors should be checked more often when performing maneuvers like lane changes or turning.

While current systems and methods for driver awareness monitoring operate for their intended purpose, there is a need for a new and improved system and method for driver awareness monitoring and coverage using ocular data techniques that utilize existing hardware to monitor vehicle operator gaze directionality and assist vehicle operators in staying attentive, avoiding states of hypnosis or carelessness, and provide coaching opportunities about vehicle operator surroundings, while maintaining or decreasing system hardware complexity and increasing system redundancy and reliability.

SUMMARY

According to several aspects of the present disclosure, a system for vehicle operator awareness coverage using ocular data in a vehicle includes a vehicle and a vehicle operator within a passenger compartment of the vehicle. The system further includes one or more sensors capturing optical information about the vehicle operator, and one or more notification devices equipped to the vehicle. The system further includes a controller having a processor, a memory, and input/output (I/O) ports. The I/O ports communicate with the one or more sensors and the one or more notification devices. The processor executes program code portions stored in the memory. The program code portions include a driver awareness coverage (DAC) application having at least first, second, third, fourth, fifth, and sixth control logics. The first control logic defines physical zones or areas of interest (AoIs) surrounding the vehicle. The second control logic processes the optical information about the vehicle operator, estimates a vehicle operator gaze direction, a field-of-view (FoV), and a focal point, and maps the vehicle operator gaze direction to AoIs surrounding the vehicle. The third control logic determines that the vehicle operator gaze direction, via the focal point, is in a range of known passenger compartment locations. The fourth control logic defines a lifespan for each of the AoIs. The fifth control logic selectively updates a lifespan of each of the AoIs depending on operator gaze directions, and executes a stimulus subroutine when a lifespan of one or more of the AoIs has been exceeded. A lifespan of one or more of the AoIs is exceeded when a vehicle operator gaze direction has not passed through the one or more AoIs for an extended period of time. The sixth control logic generates, via the notification device, a notification to the vehicle operator that prompts the vehicle operator to break a distracted, hypnotic or altered mental state of the vehicle operator and increase a vehicle operator attention level from the distracted, hypnotic or altered mental state to an attention level greater than the distracted, hypnotic, or altered mental state.

In another aspect of the present disclosure, the one or more sensors capturing optical information about the vehicle operator further include one or more driver-facing cameras capturing optical information including facial features of the vehicle operator. The one or more driver-facing cameras capture at least facial keypoints including vehicle operator pupil and eye coordinates.

In another aspect of the present disclosure the first control logic further includes control logic for identifying physical zones or AoIs around the vehicle, including at least a first zone located ahead or in front of the vehicle, a second zone located to a right side of the vehicle, a third zone located to a left side of the vehicle, a fourth zone located to a right rear of the vehicle, a fifth zone located to a left rear of the vehicle, and a sixth zone located directly behind the vehicle.

In another aspect of the present disclosure the second control logic further includes: control logic that estimates a vehicle operator FoV and focal point by mapping 2-dimensional keypoint coordinates to a raycasted 3-dimensional focus point.

In another aspect of the present disclosure the third control logic further includes control logic that, upon determining that the vehicle operator gaze direction, via the focal point, is in a range of known passenger compartment locations, updates a last-checked status of an AoI or zone in a current vehicle operator gaze direction. The last-checked status is updated to "NOW". The third control logic further includes control logic that, upon determining that the vehicle operator gaze direction, via the focal point, is not in a range of known passenger compartment locations, continues capturing facial keypoints including vehicle operator pupil and eye coordinates.

In another aspect of the present disclosure the fourth control logic further includes: control logic that defines a lifespan for each of the AoIs based on one or more of: hard-coded values, situationally adaptable or variable values that differ depending on a vehicle position, environment around the vehicle, a presence or absence of objects around the vehicle, and a vehicle location and type of road upon which the vehicle is being driven. The lifespan of an AoI in highway driving is approximately fifteen to forty seconds, and a lifespan of an AoI in city driving is up to approximately five minutes.

In another aspect of the present disclosure the extended period of time is a time greater than the lifespan of an AOI, and the fifth control logic further includes: control logic that determines whether a current time is greater than a sum of an AoI's last-checked time plus the lifespan of the AoI, and upon determining that the current time is less than or equal to the sum of AoI last-checked time plus lifespan of the AoI, the stimulus subroutine re-executes. Upon determining that the current time is greater than the sum of the AoI last-checked time plus the lifespan of the AoI, the stimulus subroutine generates a stimulus for the AoI.

In another aspect of the present disclosure the sixth control logic further includes: control logic that, utilizes one or more notification devices to provide a stimulus or notification to the vehicle operator. The stimulus or notification is a illumination of a light-emitting diode (LED) embedded in one or more of: right and left side mirrors of the vehicle, rear view mirrors or rear view displays of the vehicle, and microLEDs embedded within glass of the vehicle. The notification devices provide constantly-lit, intermittently lit, flashing, or other such states of illumination while the stimulus subroutine is generating a stimulus.

In another aspect of the present disclosure the notification devices further include: a heads-up display (HUD) of the vehicle, infotainment display of the vehicle. The notification device is distinct and easily distinguishable by a vehicle operator from objects that are depicted in the HUD, infotainment display, right and left side mirrors and rear view mirrors or displays of the vehicle.

In another aspect of the present disclosure the sixth control logic further includes: control logic that, upon determining that the vehicle operator appears to be inattentive or is ignoring all notifications for an extended period of time, generates incrementally severe notifications via the one or more notification devices, including one or more of: activating or increasing an audio volume of a vehicle infotainment system, forcibly engaging advanced driver assistance system (ADAS) features of the vehicle, including: lane assistance, and engaging vehicle hazard lights.

In another aspect of the present disclosure a method for vehicle operator awareness coverage using ocular data in a vehicle includes: capturing optical information about a vehicle operator within a passenger compartment of the vehicle with one or more sensors. The method further includes executing, by a processor of a controller of the vehicle, program code portions stored in memory of the controller. The controller further includes input/output (I/O) ports in communication with the one or more sensors and one or more notification devices. The program code portions include a driver awareness coverage (DAC) application. The DAC application includes control logic for defining physical zones or areas of interest (AoIs) surrounding the vehicle, processing the optical information about the vehicle operator, and estimating a vehicle operator gaze direction, a field-of-view (FoV), and a focal point, and maps the vehicle operator gaze direction to AoIs surrounding the vehicle. The DAC application further includes determining that the vehicle operator gaze direction, via the focal point, is in a range of known passenger compartment locations, and defining a lifespan for each of the AoIs. The DAC application further includes selectively updating a lifespan of each of the AoIs depending on operator gaze directions, and executes a stimulus subroutine when a lifespan of one or more of the AoIs has been exceeded. A lifespan of one or more of the AoIs is exceeded when a vehicle operator gaze direction has not passed through the one or more AoIs for an extended period of time. The DAC application further includes generating, via the one or more notification devices equipped to the vehicle, a notification to the vehicle operator that prompts the vehicle operator to break a distracted, hypnotic or altered mental state of the vehicle operator and increase a vehicle operator attention level from the distracted, hypnotic or altered mental state to an attention level greater than the distracted, hypnotic, or altered mental state.

In another aspect of the present disclosure the method further includes control logic for capturing optical information about the vehicle operator with one or more driver-facing cameras capturing facial features of the vehicle operator and facial keypoints of the vehicle operator, including vehicle operator pupil and eye coordinates.

In another aspect of the present disclosure the method further includes control logic for identifying physical zones or AoIs around the vehicle, including at least a first zone located ahead or in front of the vehicle, a second zone located to a right side of the vehicle, a third zone located to a left side of the vehicle, a fourth zone located to a right rear of the vehicle, a fifth zone located to a left rear of the vehicle, and a sixth zone located directly behind the vehicle.

In another aspect of the present disclosure the method further includes control logic for estimating a vehicle operator FoV and focal point by mapping 2-dimensional keypoint coordinates to a raycasted 3-dimensional focus point.

In another aspect of the present disclosure upon determining that the vehicle operator gaze direction, via the focal point, is in a range of known passenger compartment locations, the method updates a last-checked status of an AoI or zone in a current vehicle operator gaze direction. The last-checked status is updated to "NOW". Upon determining that the vehicle operator gaze direction, via the focal point, is not in a range of known passenger compartment locations, the method continues capturing facial keypoints including vehicle operator pupil and eye coordinates.

In another aspect of the present disclosure the method further includes defining a lifespan for each of the AoIs based on one or more of: hard-coded values, situationally adaptable or variable values that differ depending on a vehicle position, environment around the vehicle, a presence or absence of objects around the vehicle, and a vehicle location and type of road upon which the vehicle is being driven, where the lifespan of an AoI in highway driving is approximately fifteen to forty seconds, and a lifespan of an AoI in city driving is up to approximately five minutes.

In another aspect of the present disclosure the method further includes determining whether a current time is greater than a sum of an AoI's last-checked time plus the lifespan of the AoI, and upon determining that the current time is less than or equal to the sum of AoI last-checked time plus lifespan of the AoI, re-executing the stimulus subroutine. Upon determining that the current time is greater than the sum of the AoI last-checked time plus the lifespan of the AoI, the method generates with the stimulus subroutine, a stimulus for the AoI, where the extended period of time is a time greater than the lifespan of an AOI.

In another aspect of the present disclosure the method further includes utilizing the one or more notification devices to provide a stimulus or notification to the vehicle operator. The stimulus or notification is a illumination of a light-emitting diode (LED) embedded in one or more of: right and left side mirrors of the vehicle, rear view mirrors or rear view displays of the vehicle, and microLEDs embedded within glass of the vehicle. The notification devices provide constantly-lit, intermittently lit, flashing, or other such states of illumination while the stimulus subroutine is generating a stimulus. The notification devices further include: a heads-up display (HUD) of the vehicle, infotainment display of the vehicle. The notification device is distinct and easily distinguishable by a vehicle operator from objects that are depicted in the HUD, infotainment display, right and left side mirrors and rear view mirrors or displays of the vehicle.

In another aspect of the present disclosure upon determining that the vehicle operator appears to be inattentive or is ignoring all notifications for an extended period of time, the method generates incrementally severe notifications via the one or more notification devices, including one or more of: activating or increasing an audio volume of a vehicle infotainment system, forcibly engaging advanced driver assistance system (ADAS) features of the vehicle, including: lane assistance, and engaging vehicle hazard lights.

In another aspect of the present disclosure a method for vehicle operator awareness coverage using ocular data in a vehicle includes: capturing optical information about a vehicle operator within a passenger compartment of the vehicle with one or more sensors, including one or more driver-facing cameras capturing facial features of the vehicle operator and facial keypoints of the vehicle operator, including vehicle operator pupil and eye coordinates. The method further includes executing, program code portions with a processor of a controller, the controller having a processor, a memory, and input/output (I/O) ports, the I/O ports in communication with the one or more sensors and one or more notification devices, the program code portions stored in the memory. The program code portions include a driver awareness coverage (DAC) application having control logic for defining physical zones or areas of interest (AoIs) surrounding the vehicle, including: identifying physical zones or AoIs around the vehicle, including at least a first zone located ahead or in front of the vehicle, a second zone located to a right side of the vehicle, a third zone located to a left side of the vehicle, a fourth zone located to a right rear of the vehicle, a fifth zone located to a left rear of the vehicle, and a sixth zone located directly behind the vehicle, and processing the optical information about the vehicle operator, and estimating a vehicle operator gaze direction, a field-of-view (FoV), and a focal point, and maps the vehicle operator gaze direction to AoIs surrounding the vehicle. The method further includes determining that the vehicle operator gaze direction, via the focal point, is in a range of known passenger compartment locations, including estimating a vehicle operator FoV and focal point by mapping 2-dimensional keypoint coordinates to a raycasted 3-dimensional focus point. The method further includes defining a lifespan for each of the AoIs, including: upon determining that the vehicle operator gaze direction, via the focal point, is in a range of known passenger compartment locations, updating a last-checked status of an AoI or zone in a current vehicle operator gaze direction, wherein the last-checked status is updated to "NOW"; and upon determining that the vehicle operator gaze direction, via the focal point, is not in a range of known passenger compartment locations, continues capturing facial keypoints including vehicle operator pupil and eye coordinates. The method further includes defining a lifespan for each of the AoIs based on one or more of: hard-coded values, situationally adaptable or variable values that differ depending on a vehicle position, environment around the vehicle, and a vehicle location and type of road upon which the vehicle is being driven. The lifespan of an AoI in highway driving is approximately fifteen to forty seconds, and a lifespan of an AoI in city driving is up to approximately five minutes. The method further includes selectively updating a lifespan of each of the AoIs depending on operator gaze directions, and executing a stimulus subroutine when a lifespan of one or more of the AoIs has been exceeded. A lifespan of one or more of the AoIs is exceeded when a vehicle operator gaze direction has not passed through the one or more AoIs for an extended period of time, including: determining whether a current time is greater than a sum of an AoI's last-checked time plus the lifespan of the AoI, and upon determining that the current time is less than or equal to the sum of AoI last-checked time plus lifespan of the AoI, re-executing the stimulus subroutine; and upon determining that the current time is greater than the sum of the AoI last-checked time plus the lifespan of the AoI, generating with the stimulus subroutine, a stimulus for the AoI. The extended period of time is a time greater than the lifespan of an AOI. The method further includes generating, via the one or more notification devices equipped to the vehicle, a notification to the vehicle operator, including: utilizing the one or more notification devices to provide a stimulus or notification to the vehicle operator. The stimulus or notification is a illumination of a light-emitting diode (LED) embedded in one or more of: right and left side mirrors of the vehicle, rear view mirrors or rear view displays of the vehicle, and microLEDs embedded within glass of the vehicle. The notification devices provide constantly-lit, intermittently lit, flashing, or other such states of illumination while the stimulus subroutine is generating a stimulus, wherein the notification devices further include: a heads-up display (HUD) of the vehicle, infotainment display of the vehicle. The notification device is distinct and easily distinguishable by a vehicle operator from objects that are depicted in the HUD, infotainment display, right and left side mirrors and rear view mirrors or displays of the vehicle. Upon determining that the vehicle operator appears to be inattentive or is ignoring all notifications for an extended period of time, the method generates incrementally severe notifications via the one or more notification devices, including one or more of: activating or increasing an audio volume of a vehicle infotainment system, forcibly engaging advanced driver assistance system (ADAS) features of the vehicle, including: lane assistance, and engaging vehicle hazard lights. The notification prompts the vehicle operator to break a distracted, hypnotic or altered mental state of the vehicle operator and increase a vehicle operator attention level from the distracted, hypnotic or altered mental state to an attention level greater than the distracted, hypnotic, or altered mental state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
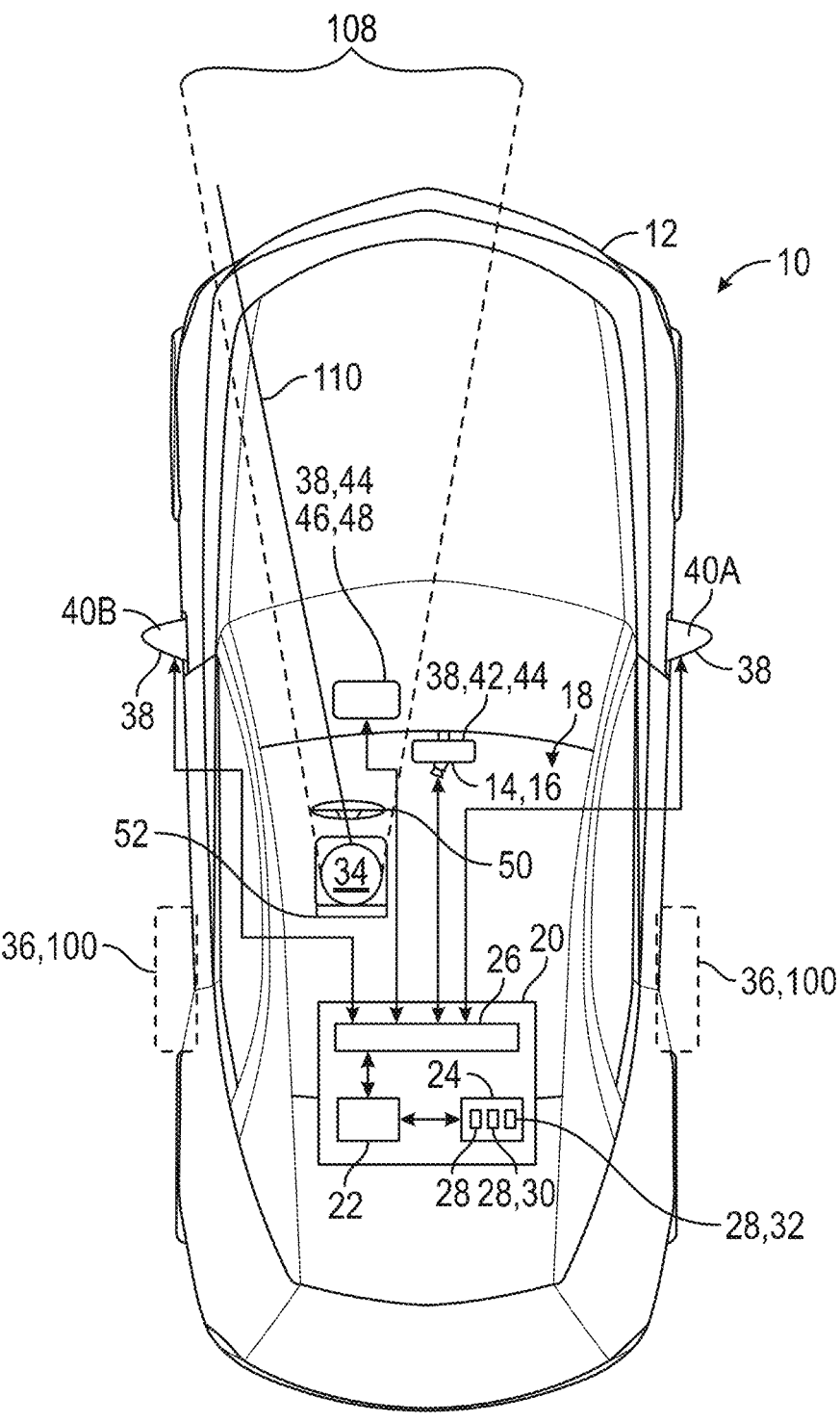
FIG. 1 is a schematic diagram of a vehicle utilizing a system for driver awareness coverage using ocular data according to an exemplary embodiment.

Referring to FIG. 1, a system 10 for driver awareness coverage using ocular data techniques is shown schematically. The system includes a vehicle 12. The vehicle 12 is illustrated as a passenger vehicle, however, it should be appreciated that the vehicle 12 may be any type of vehicle, including but not limited to: cars, trucks, sport utility vehicles (SUVs), vans, motor homes, semis, tractor-trailers, delivery vehicles including vehicles used within warehouses, tricycles, motorcycles, planes, amphibious vehicles, or any other such vehicle 12. Additionally, the vehicle 12 may be an aircraft, a watercraft, or the like without departing from the scope or intent of the present disclosure.

The system 10 further includes one or more sensors 14 integrated into the vehicle 12. The sensors 14 may include any of a wide variety of sensor types, including but not limited to: electromagnetic (EM) sensors 14 such as cameras, infra-red cameras, video cameras, light detection and ranging (LiDAR) sensors, radio detection and ranging (RADAR) sensors, sound navigation and ranging (SONAR) sensors, and the like. In a non-limiting example, the sensors 14 include at least one vehicle 12 occupant-facing sensor 14 or camera 16 disposed within an interior or passenger compartment 18 of the vehicle 12.

As used herein, the terms "forward", "rear", "inner", "inwardly", "outer", "outwardly", "above", and "below" are terms used relative to the orientation of the vehicle 12 as shown in the drawings of the present application. Thus, "forward" refers to a direction toward a front of a vehicle 12, "rearward" refers to a direction toward a rear of a vehicle 12, "inner" and "inwardly" refers to a direction towards the interior or passenger compartment 18 of a vehicle 12, and "outer" and "outwardly" refers to a direction towards the exterior of a vehicle 12, "below" refers to a direction towards the bottom of the vehicle 12, and "above" refers to a direction towards a top of the vehicle 12.

The system 10 further includes one or more controllers 20 in communication with the various sensors 14 of the vehicle 12, processes information received therefrom, and generates output signals that are used to assist the vehicle operator 34 in maintaining attention and avoiding highway hypnosis or white line fever. The controllers 20 are integrated into the vehicle 12. More specifically, the controllers 20 are non-generalized, electronic control devices having a preprogrammed digital computer or processor 22, non-transitory computer readable medium or memory 24 used to store data such as control logic, software applications, instructions, computer code, data lookup tables, etc., and input/output (I/O) ports 26. Computer readable medium or memory 24 includes any type of medium capable of being accessed by a computer, such as read only memory (ROM), random access memory (RAM), a hard disk drive, a compact disk (CD), a digital video disc (DVD), or any other type of memory. A "non-transitory" computer readable memory 24 excludes wired, wireless, optical, or other communication links that transport transitory electrical or other signals. A non-transitory computer readable memory 24 includes media where data can be permanently stored, and media where data can be stored and later overwritten, such as a rewritable optical disc or an erasable memory device. Computer code includes any type of program code, including source code, object code, and executable code. The processor 22 is configured to execute the code or instructions. The vehicle 12 may have additional controllers 20 such as a dedicated Wi-Fi controller, an engine control module, a transmission control module, a body control module, an infotainment control module, or the like. The I/O ports 26 may be configured to communicate via wired communications, wirelessly via Wi-Fi protocols under IEEE 802.11x, or the like without departing from the scope or intent of the present disclosure.

The controller 20 further includes one or more applications 28. An application 28 is a software program configured to perform a specific function or set of functions. The application 28 may include one or more computer programs, software components, sets of instructions, procedures, functions, objects, classes, instances, related data, or portions thereof adapted for implementation in a suitable computer readable program code. The applications 28 may be stored within the memory 24 or in additional or separate memory 24. Examples of applications 28 include audio or video streaming services, games, browsers, social media, etc. In other examples, the applications 28 are used to manage body control system functions, suspension control system functions, transmission and/or engine control system functions or the like in an exemplary vehicle 12.

Figure 2A:
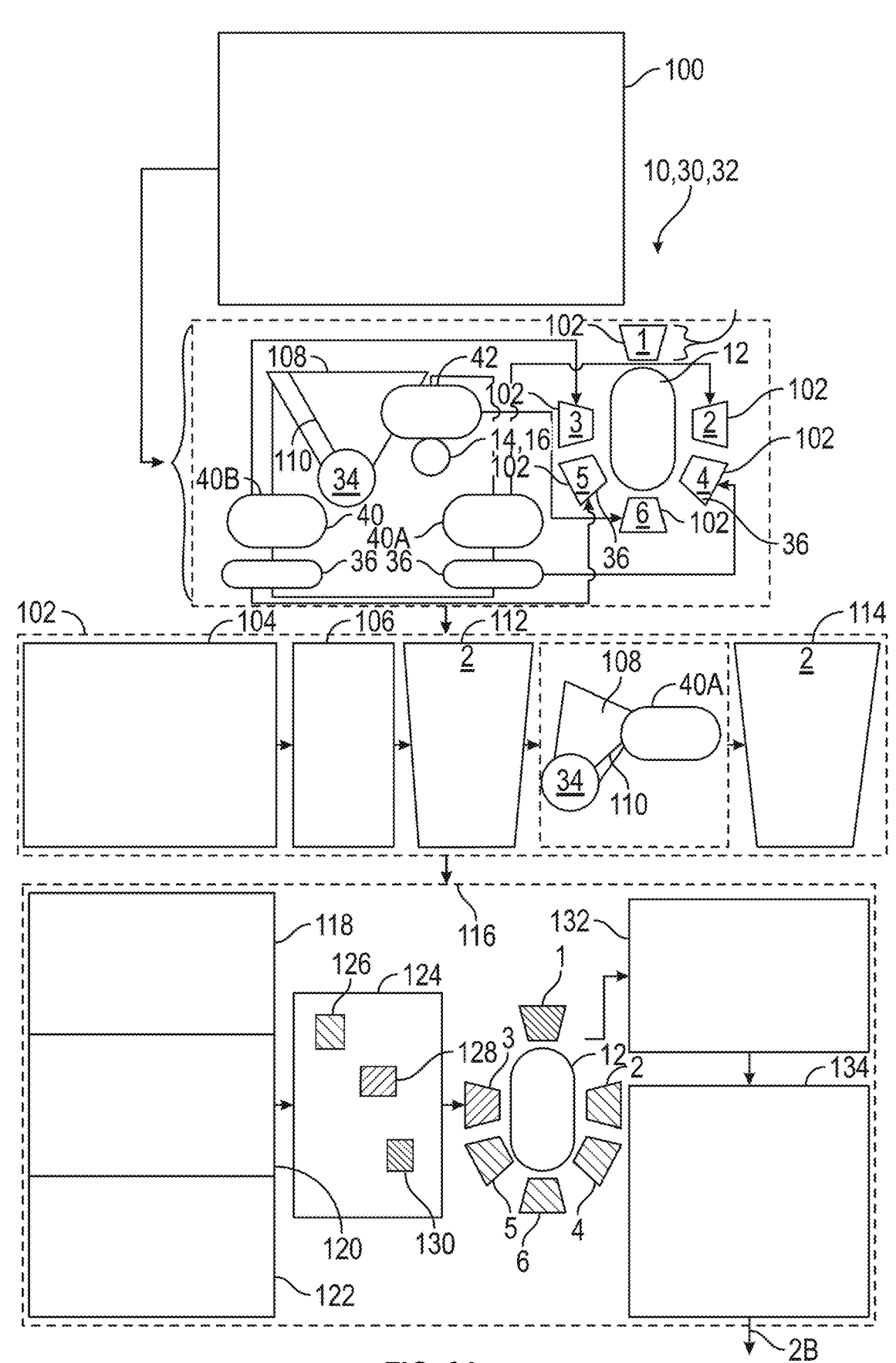
FIG. 2A is a flowchart depicting a logical flow of a first portion of a driver awareness coverage (DAC) application of the system of FIG. 1 according to an exemplary embodiment.
Figure 2B:
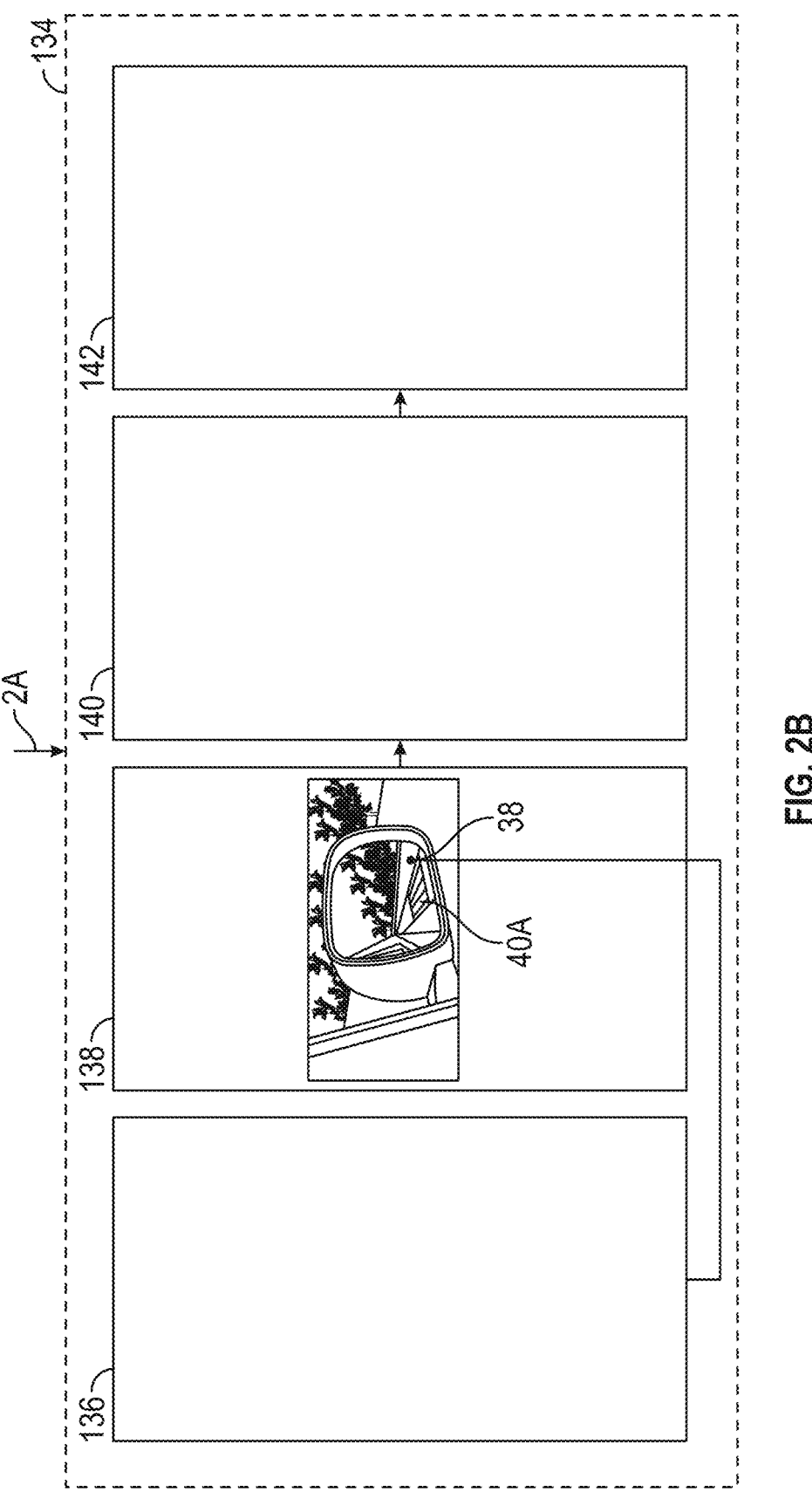
FIG. 2B is a flowchart depicting logical flow of a second portion of the DAC application of FIG. 2A according to an exemplary embodiment.

Referring now to FIGS. 2A and 2B and with continuing reference to FIG. 1, the system 10 utilizes one or more applications 28, specifically a driver awareness coverage (DAC) application 30 that utilizes ocular data is shown in flowchart form. The system 10 and DAC application 30 also utilizes a facial feature extraction (FFE) application 32. The DAC application 30 utilizes ocular data collected by the driver-facing camera 16 to assist vehicle operators 34 in avoiding or mitigating highway hypnosis, and ensuring that the vehicle operator 34 is monitoring vehicle 12 blind spots 36. Highway hypnosis, also known as white line fever, is an altered mental state in which a vehicle operator 34 can drive substantial distances and respond adequately to external events without any recollection of having made responses. Some data suggests that highway hypnosis may arise out of the presence of monotonous scenery or repetitious imagery, such as dashed or solid lane markings on a road surface. Accordingly, the DAC application 30 identifies and responds to vehicle operator 34 behavior approximating or indicating a state of highway hypnosis or other such altered or distracted mental state.

The DAC application 30 utilizes an algorithmic approach to decrease vehicle operator 34 hypnosis state and increase vehicle operator 34 awareness. A first control logic 100 of the DAC application 30 defines physical zones or areas of interest (AoIs) 102 surrounding the vehicle 12. AoIs 102 are defined according to several distinct properties including, but not necessarily limited to: 1) a time since an AoI 102 was last checked; 2) a physical position of the AoI 102 around the vehicle 12; 3) an in-cabin gaze direction mapped to a position of an AOI 102 around the vehicle 12; and 4) a lifespan, defined as a quantity of time until it has been determined that a particular AoI 102 should be checked again. The vehicle 12 shown in FIG. 2A includes six (6) AoIs 102, including zone 1, located ahead or in front of the vehicle 12, zone 2 located to a right side of the vehicle 12, zone 3 located to a left side of the vehicle 12, zone 4 located to a right rear of the vehicle 12, zone 5 located to a left rear of the vehicle 12, and zone 6 located directly behind the vehicle 12. Each of zones 1-6 is mapped to distinct vehicle operator 34 gaze directions. While six distinct AoIs 102 or zones 1-6 are shown in FIG. 2A, it should be appreciated that any number of AoIs 102 or zones 1-6 may be defined around the vehicle 12 depending on the particular application or vehicle 12 without departing from the scope or intent of the present disclosure.

A second control logic 102 of the DAC application 30 utilizes the FFE application 32 and the driver-facing camera to detect 104 a vehicle operator's 34 gaze direction, and estimate 106 a vehicle operator 34 field of view (FoV) 108, and subsequently fine tunes 106 a focal point 110 of the FoV 108 based on vehicle operator 34 eye movement. It will be appreciated that a gaze direction of the vehicle operator 34 changes the vehicle operator's 34 FoV 108 direction as well.

As a vehicle operator's 34 gaze and measured FoV 108 changes, and the vehicle operator 34 scans different areas of the passenger compartment 18 and environment of the vehicle 12, the DAC application 30 detects whether the vehicle operator's 34 gaze is scanning distinct areas, and then updates the state of the relevant AoIs 102 through which the vehicle operator's 34 gaze has passed. The updated AoI 102 states then reset or extend the life of each of the relevant AoIs 102 or zones 1-6 that the vehicle operator 34 is scanning or has scanned.

In the non-limiting example shown in FIG. 2A, the DAC application 30 may determine that the vehicle operator 34 has last checked zone 2 within thirty seconds as shown at block 112. This means that the vehicle operator 34 last checked immediately to a right of the vehicle 12 or the right mirror 40A of the vehicle 12 thirty seconds ago, and the life of the right mirror 40A is then set to a predetermined or variable lifespan of between fifteen and forty seconds. When the vehicle operator 34 subsequently checks the right side mirror 40A within the fifteen to forty second lifespan, the DAC application 30 resets the lifespan of zone 2 as shown at block 114.

A third control logic 116 of the DAC application 30 in combination with the FFE application 32 allows a lifespan of the AoIs 102 or zones 1-6 to change responsively over time in certain situations. In non-limiting examples shown at block 118 a lifespan of the zones 1-6 or AoIs 102 may change responsively when the vehicle operator 34 is maneuvering the vehicle 12 without checking the zones 1-6 or AoIs 102 first. In some circumstances, it is important to prompt the vehicle operator 34 in an early detection step 120 upon determining via the DAC application 30 that the vehicle operator 34 is insufficiently responsive, indicating that the vehicle operator 34 may be in a state of hypnosis, or similar altered mental state. In additional examples, shown at step 122, the system 10 may recognize, via the DAC application 30 that the vehicle operator 34 is expressing a lack of response or recognition to the presence of many stimuli passing around the vehicle 12 through the zones 1-6, indicating that the vehicle operator 34 is not taking sufficient care to monitor each of the zones 1-6 and AoIs 102. In each of the foregoing situations, it should be appreciated that a determination of the lifespan of the AoIs 102 may be hard-coded value, and/or may vary situationally. In some non-limiting examples, the lifespan of the AoIs 102 may be fixed, variable, or set to fall within a particular range of times depending at least in part upon location. The lifespan may be, for example, between about fifteen and about forty seconds in highway driving, up to five minutes in city driving, or the like. In another non-limiting example, the lifespan of AoIs 102 during city driving may be approximately one and one-half minutes (one minute, thirty seconds), or the like. That is, because city driving requires significantly more vehicle operator 34 input and attention, it is unlikely that a vehicle operator 34 may enter a hypnotic or altered mental state. Accordingly, the lifespan of an AoI 102 in city driving or in city locations may be substantially longer than the lifespan of an AoI 102 when the vehicle 12 is driven on a highway, or in another such steady-state situation. However, it should be appreciated that the length of a lifespan of an AoI 102 may vary substantially from the above without departing from the scope or intent of the present disclosure. Additionally, the variable lifespan of an AoI 102 may depend on additional factors, including but not limited to: vehicle operator 34 biometrics, such as age, a quantity of time driving during the current trip, or the like; road surface information and road undulation and curvature;

a presence or lack of differentiable scenery, traffic levels, and the like. As shown in block 124 the lifespans of AoIs 102 are depicted as having different shading corresponding to proximity to end-of-lifespan. AoIs 102 having exceeded end-of-life in the non limiting example shown in FIG. 2A are shown having a first shading 126, while those approaching end-of-life are depicted as having a second shading 128 distinct from the first. Finally, AoIs 102 that have recently been checked by the vehicle operator 34 and which are not close to end-of-life are depicted as having a third shading 130 distinct from the first and second shadings 126, 128.

In some examples and certain situations, such as those AoIs 102 depicted in FIG. 2A having the first shading 126 and beyond end-of-life, the DAC application 30 determines at block 132 that the vehicle operator 34 is in a hypnotic or distracted state, only locked into what is immediately ahead of the vehicle 12 and therefore having only limited awareness to other vehicle 12 surroundings. Subsequently, at block 134, the system 10 and DAC application 30 monitors and after a certain time interval of continuously ignoring AoIs 102 that have exceeded end-of-life, the DAC application 30 notifies the vehicle operator 34 that they are not driving in a sufficiently responsive manner when the vehicle operator 34 has not changed FoV 108 directionality sufficiently frequently, or with sufficient movement to indicate intentionality. In such situations, the DAC application 30 determines that the vehicle operator 34 may be in a state of highway hypnosis or other such altered mental state, and generates a vehicle operator 34 notification.

Vehicle operator 34 notifications may be provided in a variety of different ways and through a variety of distinct notification devices 38 without departing from the scope or intent of the present disclosure. In some non-limiting examples, vehicle operator 34 notifications are provided via notification devices 38, such as light-emitting diodes (LEDs) or microLEDs placed throughout the passenger compartment 18 of the vehicle 12 and/or disposed within left and right exterior mirrors 40A, 40B, rear-view displays or rear-view mirrors 42 of the vehicle 12, or even embedded within glass of the vehicle 12 windows. In additional examples, the vehicle operator 34 notifications may be provided via a human-machine interface (HMI) 44 of the vehicle 12, such as a heads-up display (HUD) 46 or infotainment display 48 of the vehicle 12, and/or via haptic feedback provided by vibrations generated by vibration motors within vehicle 12 controls including but not limited to a steering wheel 50, or contact points such as a vehicle operator 34 seat 52, or the like.

Turning now more specifically to FIG. 2B and with continuing reference to FIGS. 1 and 2A, control logic 134 of the DAC application 30 that generates the notification to the vehicle operator 34 is shown in additional detail. Exemplary vehicle operator 34 notifications at block 136 may be presented to the vehicle operator 34 via notification devices 38 such as LEDs having a variety of different colorations, brightnesses, intensities, and the like. Distinctly different from objects that may be depicted in an exemplary right-side mirror 40A, for example, the LED may be a red dot that attempts to gather vehicle operator 34 attention to break hypnosis or other distracted state. Such a red dot LED notification device 38 is shown at block 138 pictorially. It will be appreciated that the notification devices 38 may present notifications to the vehicle operator 34 as constantly-lit, intermittently lit, flashing, or other such states of illumination without departing from the scope or intent of the present disclosure.

Subsequently, at block 140, in addition to notifications presented as described in respect to blocks 136 and 138, a similar visualization may be presented on the HUD 46 to indicate to the vehicle operator 34 a lack of attentiveness. However, it will be appreciated that engagement of notification devices 38 of the HUD 46, flashing or otherwise, are intended to be kept to a minimum to avoid vehicle operator 34 annoyance and to limit further vehicle operator 34 distraction. Finally, at block 142, if the vehicle operator 34 appears to be inattentive or is ignoring all notifications for an extended period of time (e.g., for several minutes), the system 10 and DAC application 30 may generate incrementally severe notifications via the one or more notification devices 38, including: activating or increasing an audio volume of a vehicle 12 head unit or infotainment system, forcibly engaging advanced driver assistance system (ADAS) features, such as lane assistance, engaging vehicle 12 hazard lights, or the like. The relative extremeness of the measures possibly taken at block 142 serve the purpose of providing additional and different stimulus to the vehicle operator 34 in an attempt to break a distracted, hypnotic, or altered mental state and increase a vehicle operator 34 attention level from the distracted, hypnotic, or altered mental state to an attention level greater than the distracted, hypnotic, or altered mental state. It should be appreciated, however, that distraction or inattentiveness is distinct and separable from the hypnotic or altered mental state that the present system 10 is designed to avoid. Distraction and inattentiveness may, for example, be caused by a vehicle operator 34 taking phone calls, manipulating the vehicle's 12 infotainment system, talking with a passenger, or the like. However, vehicle operator 34 active distraction through phone calls, infotainment distractions, or passenger distractions are separable from hypnotic or altered mental state because the vehicle operator 34 in an actively distracted state is still changing FoV 108, and altering gaze direction with some frequency that the system 10 via the driver-facing camera 16 will recognize as altering lifespan of various AoIs 102 as the vehicle operator 34 moves their FoV 108 over time.

Figure 3:
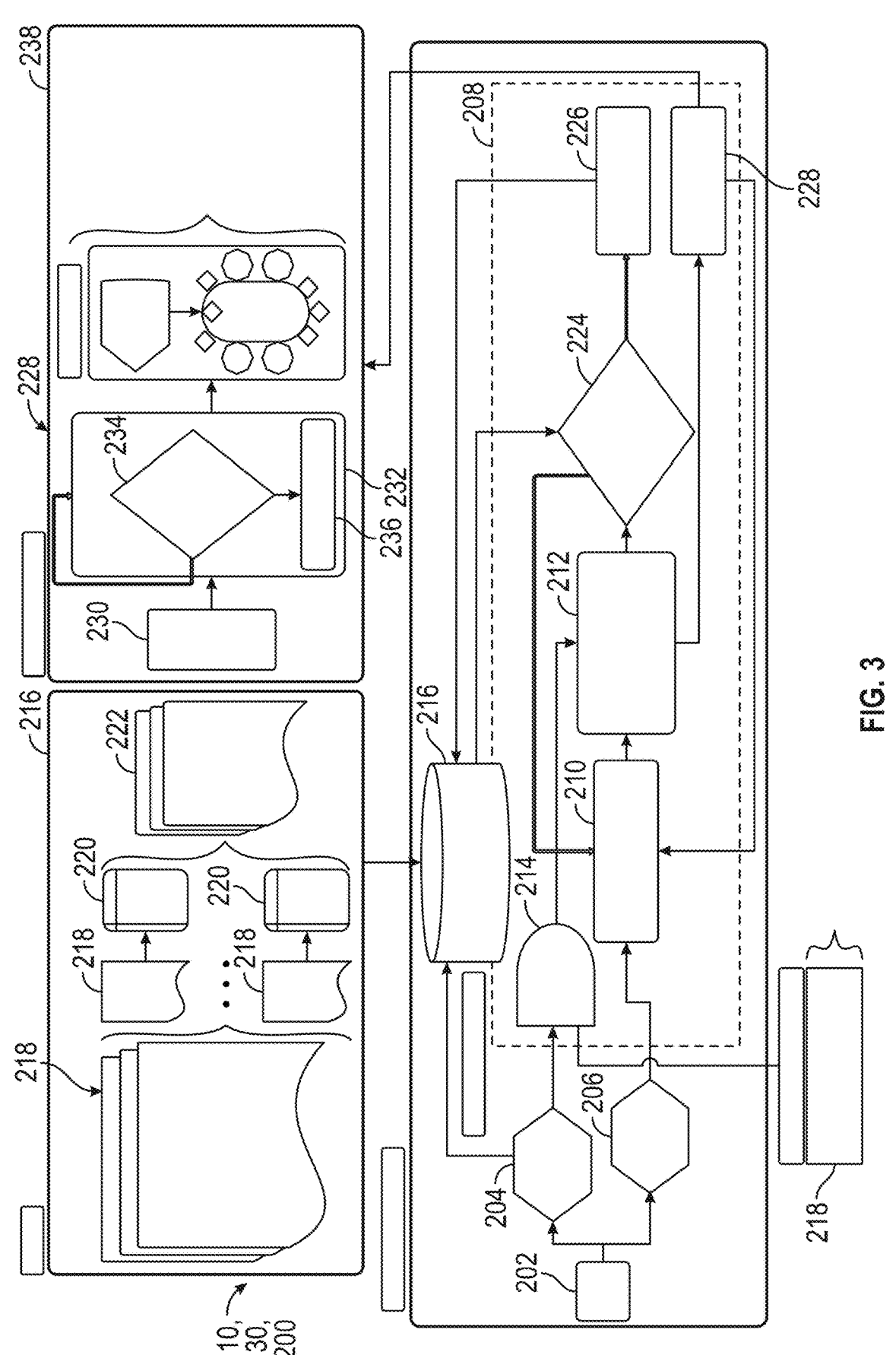
FIG. 3 is a flowchart depicting logical flow of a method of driver awareness coverage using ocular data according to an exemplary embodiment.

Turning now to FIG. 3 and with continuing reference to FIGS. 1, 2A, and 2B, a method 200 of vehicle operator 34 awareness coverage using ocular data is shown in flowchart form. The method 200 begins at block 202 when the vehicle 12 is started. At block 204, the method 200 through the DAC application 30 initializes vehicle zones 1-6 and detects objects in the vehicle's 12 environment. In parallel with block 204, the method 200 through the DAC application 30 where the method first initializes the vehicle's 12 driver-facing camera 16 at block 206. From block 206, the method 200 initializes a primary looping logic 208 and proceeds to block 210 where the FFE application 32 collects facial keypoints of the vehicle operator 34, including pupil and eye coordinates. The facial information captured by the FFE application 32 is stored only in RAM for instantaneous access, thereby preventing long-term storage of personally-identifiable information (PII), and increasing vehicle operator privacy. At block 212, the method, via the FFE application 32 estimates a vehicle operator FoV 108 and focal point 110 and maps the FoV 108 and focal point 110 to 2-dimensional keymap coordinates in a ray-casted 3-dimensional focus point.

Referring once more to block 204, once the vehicle 12 zones 1-6 and objects have been initialized, the method 200 proceeds in parallel to block 214, within the primary loop logic 208, and to block 216. At block 214, the method 200 performs an on-start check and sets the regular time intervals or lifespans of each of the AoIs 102 based on a life determination coroutine 218. The life determination coroutine 218 assists in initializing and determining whether lifespans of zones 1-6 and AoIs 102 should be increased or decreased based on vehicle operator 34 attention level and environmental conditions. At block 216, the method 200 maps zone 1-6 objects in the interior (passenger compartment 18) to the exterior (environment) zone 1-6 map. In several aspects, the mapping step at block 216 utilizes passenger compartment 18 locations 218 as inputs to an algorithm that maps the passenger compartment locations 218 to zone objects 220, and then to zone 1-6 AoI 102 objects at blocks 222.

From blocks 212 and 216 the method 200 and DAC application 30 determines at block 224 whether a 3-dimensional focal point 110 is in a range of known passenger compartment 18 locations. Upon determining at block 224 that the 3-dimensional focal point 110 is not in the range of known passenger compartment 18 locations, the method 200 returns to block 210. However, upon determining that the 3-dimensional focal point 110 is in the range of known passenger compartment 18 locations, the method 200 proceeds from block 224 to block 226 where the zone 1-6 AoI 102 last-checked status is updated to a "now" or current status, thereby resetting a lifespan of the relevant AoI 102 and zone 1-6.

Referring once more to block 212, the method 200 proceeds in parallel to block 228 where the method 200 executes a stimulus subroutine of the DAC application 30. The stimulus subroutine starts at block 230 where initialization conditions are checked. The initialization conditions include a vehicle 12 on status and the presence or detection of AoI 102 objects. Then, at block 232, for each AoI 102 object, a looped control logic is executed. At block 234, the stimulus subroutine checks to see if a current time or a "NOW" is greater than a sum of the AoI 102 last-checked time plus the lifespan of the relevant AoI 102. Upon determining that "NOW" is less than or equal to the sum of AoI 102 last-checked time plus lifespan of the relevant AoI 102, the stimulus subroutine re-executes and continues to check at block 234. However, upon determining that "NOW" is greater than the sum of the AoI 102 last-checked time plus the lifespan of the relevant AoI 102, the stimulus subroutine proceeds to block 236 and generates a stimulus for the relevant AoI 102. The stimulus subroutine then proceeds to block 238 where the method 200 generates the notification via one or more of the notification devices 38, the HUD 46, and/or the other HMIs 44 of the vehicle 12, thereby causing the vehicle operator 34 to exist the hypnotic or altered mental state identified by the system 10 and method 200. It will be appreciated that the various AoIs 102 shown and described herein are not indicative of all possible vehicle 12 configurations, and can exist in effectively infinite variations without departing from the scope or intent of the present disclosure. From block 228, the method 200 returns to block 210, where the method 200 runs continuously until the vehicle 12 is turned off.

A system 10 and method 200 for vehicle operator 34 awareness coverage using ocular data of the present disclosure offers several advantages. These include, the ability to provide vehicle operators 34 with immediate, consistent, and accurate feedback about how a vehicle operator 34 is driving, and namely, whether and when the vehicle operator 34 has entered a distracted state, a hypnotic state, or other such state of altered mentality. Moreover, the system 10 and method 200 of the present disclosure maintain or decrease overall system 10 complexity, improve system 10 redundancy and robustness, decrease the potential for vehicle operators 34 to operate vehicles 12 while distracted or in a hypnotic or altered mental state, increase vehicle operator 34 awareness levels, and reduce the potential for human operator error, while making effective and efficient use of preexisting hardware. Moreover, the system 10 and method 200 of the present disclosure may be adapted, retrofitted, or installed as a package on vehicles 12 equipped with appropriate hardware, and the like without departing from the scope or intent of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for vehicle operator awareness coverage using ocular data in a vehicle comprises:

a vehicle;

a vehicle operator within a passenger compartment of the vehicle;

one or more sensors capturing optical information about the vehicle operator;

one or more notification devices equipped to the vehicle;

a controller having a processor, a memory, and input/output (I/O) ports, the I/O ports in communication with the one or more sensors and the one or more notification devices, the processor executing program code portions stored in the memory, the program code portions including a driver awareness coverage (DAC) application, the DAC application comprising:

a first control logic for defining physical zones or areas of interest (AoIs) surrounding the vehicle;

a second control logic for processing the optical information about the vehicle operator, estimates a vehicle operator gaze direction, a field-of-view (FoV), and a focal point, and maps the vehicle operator gaze direction to AoIs surrounding the vehicle;

a third control logic that determines that the vehicle operator gaze direction, via the focal point, is in a range of known passenger compartment locations, the third control logic further comprising:

control logic that, upon determining that the vehicle operator gaze direction, via the focal point, is in a range of known passenger compartment locations, updates a last-checked status of an AoI or zone in a current vehicle operator gaze direction, wherein the last-checked status is updated to "NOW"; and control logic that, upon determining that the vehicle operator gaze direction, via the focal point, is not in a range of known passenger compartment locations, continues capturing facial keypoints including vehicle operator pupil and eye coordinates;

a fourth control logic that defines a lifespan for each of the AoIs;

a fifth control logic that selectively updates a lifespan of each of the AoIs depending on operator gaze directions, and executes a stimulus subroutine when a lifespan of one or more of the AoIs has been exceeded, wherein a lifespan of one or more of the AoIs is exceeded when a vehicle operator gaze direction has not passed through the one or more AoIs for an extended period of time; and a sixth control logic that generates, via the notification device, a notification to the vehicle operator that prompts the vehicle operator to break a distracted, hypnotic or altered mental state of the vehicle operator and increase a vehicle operator attention level from the distracted, hypnotic or altered mental state to an attention level greater than the distracted, hypnotic, or altered mental state.

2. The system of claim 1, wherein the one or more sensors capturing optical information about the vehicle operator further comprise:

one or more driver-facing cameras capturing optical information including facial features of the vehicle operator, the one or more driver-facing cameras capturing facial keypoints including vehicle operator pupil and eye coordinates.

3. The system of claim 1, wherein the first control logic further comprises:

control logic for identifying physical zones or AoIs around the vehicle, including at least a first zone located ahead or in front of the vehicle, a second zone located to a right side of the vehicle, a third zone located to a left side of the vehicle, a fourth zone located to a right rear of the vehicle, a fifth zone located to a left rear of the vehicle, and a sixth zone located directly behind the vehicle.

4. The system of claim 2, wherein the second control logic further comprises:

control logic that estimates a vehicle operator FoV and focal point by mapping 2-dimensional keypoint coordinates to a raycasted 3-dimensional focus point.

5. The system of claim 1, wherein the fourth control logic further comprises:

control logic that defines a lifespan for each of the AoIs based on one or more of: hard-coded values, situationally adaptable or variable values that differ depending on a vehicle position, environment around the vehicle, a presence or absence of objects around the vehicle, and a vehicle location and type of road upon which the vehicle is being driven, wherein the lifespan of an AoI in highway driving is approximately fifteen to forty seconds, and a lifespan of an AoI in city driving is up to approximately five minutes.

6. The system of claim 1, wherein the extended period of time is a time greater than the lifespan of an AOI, and the fifth control logic further comprises:

control logic that determines whether a current time is greater than a sum of an AoI's last-checked time plus the lifespan of the AoI, and upon determining that the current time is less than or equal to the sum of AoI last-checked time plus lifespan of the AoI, the stimulus subroutine re-executes; and upon determining that the current time is greater than the sum of the AoI last-checked time plus the lifespan of the AoI, the stimulus subroutine generates a stimulus for the AoI.

7. The system of claim 6, wherein the sixth control logic further comprises:

control logic that, utilizes one or more notification devices to provide a stimulus or notification to the vehicle operator, wherein the stimulus or notification is a illumination of a light-emitting diode (LED) embedded in one or more of: right and left side mirrors of the vehicle, rear view mirrors or rear view displays of the vehicle, and microLEDs embedded within glass of the vehicle, wherein the notification devices provide constantly-lit, intermittently lit, flashing, or other states of illumination while the stimulus subroutine is generating a stimulus.

8. The system of claim 7, wherein the notification devices further comprise:

a heads-up display (HUD) of the vehicle, infotainment display of the vehicle; and wherein the notification device is distinct and easily distinguishable by a vehicle operator from objects that are depicted in the HUD, infotainment display, right and left side mirrors and rear view mirrors or displays of the vehicle.

9. The system of claim 8, wherein the sixth control logic further includes:

control logic that, upon determining that the vehicle operator appears to be inattentive or is ignoring all notifications for an extended period of time, generates incrementally severe notifications via the one or more notification devices, including one or more of: activating or increasing an audio volume of a vehicle infotainment system, forcibly engaging advanced driver assistance system (ADAS) features of the vehicle, including: lane assistance, and engaging vehicle hazard lights.

10. A method for vehicle operator awareness coverage using ocular data in a vehicle comprises:

capturing optical information about a vehicle operator within a passenger compartment of the vehicle with one or more sensors;

executing, by a processor of a controller of the vehicle, program code portions stored in memory of the controller, the controller further including input/output (I/O) ports in communication with the one or more sensors and one or more notification devices, the program code portions including a driver awareness coverage (DAC) application, the DAC application having control logic for:

defining physical zones or areas of interest (AoIs) surrounding the vehicle;

processing the optical information about the vehicle operator, and estimating a vehicle operator gaze direction, a field-of-view (FoV), and a focal point, and maps the vehicle operator gaze direction to AoIs surrounding the vehicle;

determining that the vehicle operator gaze direction, via the focal point, is in a range of known passenger compartment locations, and:

upon determining that the vehicle operator gaze direction, via the focal point, is in a range of known passenger compartment locations, updating a last-checked status of an AoI or zone in a current vehicle operator gaze direction, wherein the last-checked status is updated to "NOW"; and upon determining that the vehicle operator gaze direction, via the focal point, is not in a range of known passenger compartment locations, continues capturing facial keypoints including vehicle operator pupil and eye coordinates;

defining a lifespan for each of the AoIs;

selectively updating a lifespan of each of the AoIs depending on operator gaze directions, and executes a stimulus subroutine when a lifespan of one or more of the AoIs has been exceeded, wherein a lifespan of one or more of the AoIs is exceeded when a vehicle operator gaze direction has not passed through the one or more AoIs for an extended period of time; and generating, via the one or more notification devices equipped to the vehicle, a notification to the vehicle operator that prompts the vehicle operator to break a distracted, hypnotic or altered mental state of the vehicle operator and increase a vehicle operator attention level from the distracted, hypnotic or altered mental state to an attention level greater than the distracted, hypnotic, or altered mental state.

11. The method of claim 10, further comprising:

capturing optical information about the vehicle operator with one or more driver-facing cameras capturing facial features of the vehicle operator and facial keypoints of the vehicle operator, including vehicle operator pupil and eye coordinates.

12. The method of claim 10, further comprising:

identifying physical zones or AoIs around the vehicle, including at least a first zone located ahead or in front of the vehicle, a second zone located to a right side of the vehicle, a third zone located to a left side of the vehicle, a fourth zone located to a right rear of the vehicle, a fifth zone located to a left rear of the vehicle, and a sixth zone located directly behind the vehicle.

13. The method of claim 11, further comprising:

estimating a vehicle operator FoV and focal point by mapping 2-dimensional keypoint coordinates to a ray-casted 3-dimensional focus point.

14. The method of claim 10, further comprising:

defining a lifespan for each of the AoIs based on one or more of: hard-coded values, situationally adaptable or variable values that differ depending on a vehicle position, environment around the vehicle, a presence or absence of objects around the vehicle, and a vehicle location and type of road upon which the vehicle is being driven, wherein the lifespan of an AoI in highway driving is approximately fifteen to forty seconds, and a lifespan of an AoI in city driving is up to approximately five minutes.

15. The method of claim 10, further comprising:

determining whether a current time is greater than a sum of an AoI's last-checked time plus the lifespan of the AoI, and upon determining that the current time is less than or equal to the sum of AoI last-checked time plus lifespan of the AoI, re-executing the stimulus subroutine; and upon determining that the current time is greater than the sum of the AoI last-checked time plus the lifespan of the AoI, generating with the stimulus subroutine, a stimulus for the AoI, wherein the extended period of time is a time greater than the lifespan of an AOI.

16. The method of claim 15, further comprising:

utilizing the one or more notification devices to provide a stimulus or notification to the vehicle operator, wherein the stimulus or notification is a illumination of a light-emitting diode (LED) embedded in one or more of: right and left side mirrors of the vehicle, rear view mirrors or rear view displays of the vehicle, and microLEDs embedded within glass of the vehicle, wherein the notification devices provide constantly-lit, intermittently lit, flashing, or other states of illumination while the stimulus subroutine is generating a stimulus, wherein the notification devices further comprise:

a heads-up display (HUD) of the vehicle, infotainment display of the vehicle; and wherein the notification device is distinct and easily distinguishable by a vehicle operator from objects that are depicted in the HUD, infotainment display, right and left side mirrors and rear view mirrors or displays of the vehicle.

17. The method of claim 16, further comprising:

upon determining that the vehicle operator appears to be inattentive or is ignoring all notifications for an extended period of time, generating incrementally severe notifications via the one or more notification devices, including one or more of: activating or increasing an audio volume of a vehicle infotainment system, forcibly engaging advanced driver assistance system (ADAS) features of the vehicle, including: lane assistance, and engaging vehicle hazard lights.

18. A method for vehicle operator awareness coverage using ocular data in a vehicle comprises:

capturing optical information about a vehicle operator within a passenger compartment of the vehicle with one or more sensors, including one or more driver-facing cameras capturing facial features of the vehicle operator and facial keypoints of the vehicle operator, including vehicle operator pupil and eye coordinates;

executing, by a processor of a controller of the vehicle, program code portions stored in memory of the controller, the controller further including input/output (I/O) ports in communication with the one or more sensors and one or more notification devices, the program code portions including a driver awareness coverage (DAC) application, the DAC application having control logic for:

defining physical zones or areas of interest (AoIs) surrounding the vehicle, including:

identifying physical zones or AoIs around the vehicle, including at least a first zone located ahead or in front of the vehicle, a second zone located to a right side of the vehicle, a third zone located to a left side of the vehicle, a fourth zone located to a right rear of the vehicle, a fifth zone located to a left rear of the vehicle, and a sixth zone located directly behind the vehicle;

processing the optical information about the vehicle operator, and estimating a vehicle operator gaze direction, a field-of-view (FoV), and a focal point, and maps the vehicle operator gaze direction to AoIs surrounding the vehicle;

determining that the vehicle operator gaze direction, via the focal point, is in a range of known passenger compartment locations, including estimating a vehicle operator FoV and focal point by mapping 2-dimensional keypoint coordinates to a raycasted 3-dimensional focus point;

defining a lifespan for each of the AoIs, including:

upon determining that the vehicle operator gaze direction, via the focal point, is in a range of known passenger compartment locations, updating a last-checked status of an AoI or zone in a current vehicle operator gaze direction, wherein the last-checked status is updated to "NOW"; and upon determining that the vehicle operator gaze direction, via the focal point, is not in a range of known passenger compartment locations, continues capturing facial keypoints including vehicle operator pupil and eye coordinates;

defining a lifespan for each of the AoIs based on one or more of: hard-coded values, situationally adaptable or variable values that differ depending on a vehicle position, environment around the vehicle, a presence or absence of objects around the vehicle, and a vehicle location and type of road upon which the vehicle is being driven, wherein the lifespan of an AoI in highway driving is approximately fifteen to forty seconds, and a lifespan of an AoI in city driving is up to approximately five minutes;

selectively updating a lifespan of each of the AoIs depending on operator gaze directions, and executes a stimulus subroutine when a lifespan of one or more of the AoIs has been exceeded, wherein a lifespan of one or more of the AoIs is exceeded when a vehicle operator gaze direction has not passed through the one or more AoIs for an extended period of time, including:

determining whether a current time is greater than a sum of an AoI's last-checked time plus the lifespan of the AoI, and upon determining that the current time is less than or equal to the sum of AoI last-checked time plus lifespan of the AoI, re-executing the stimulus subroutine; and upon determining that the current time is greater than the sum of the AoI last-checked time plus the lifespan of the AoI, generating with the stimulus subroutine, a stimulus for the AoI, wherein the extended period of time is a time greater than the lifespan of an AOI; and generating, via the one or more notification devices equipped to the vehicle, a notification to the vehicle operator, including:

utilizing the one or more notification devices to provide a stimulus or notification to the vehicle operator, wherein the stimulus or notification is a illumination of a light-emitting diode (LED) embedded in one or more of: right and left side mirrors of the vehicle, rear view mirrors or rear view displays of the vehicle, and microLEDs embedded within glass of the vehicle, wherein the notification devices provide constantly-lit, intermittently lit, flashing, or other states of illumination while the stimulus subroutine is generating a stimulus, wherein the notification devices further comprise:

a heads-up display (HUD) of the vehicle, infotainment display of the vehicle; and wherein the notification device is distinct and easily distinguishable by a vehicle operator from objects that are depicted in the HUD, infotainment display, right and left side mirrors and rear view mirrors or displays of the vehicle; and upon determining that the vehicle operator appears to be inattentive or is ignoring all notifications for an extended period of time, generating incrementally severe notifications via the one or more notification devices, including one or more of: activating or increasing an audio volume of a vehicle infotainment system, forcibly engaging advanced driver assistance system (ADAS) features of the vehicle, including: lane assistance, and engaging vehicle hazard lights, wherein the notification prompts the vehicle operator to break a distracted, hypnotic or altered mental state of the vehicle operator and increase a vehicle operator attention level from the distracted, hypnotic or altered mental state to an attention level greater than the distracted, hypnotic, or altered mental state.

\* \* \* \* \*